Oct. 12, 1965 R. W. GOODE 3,211,394
WINDING DEVICE FOR TWISTED CABLE
Filed Sept. 26, 1962 6 Sheets-Sheet 5
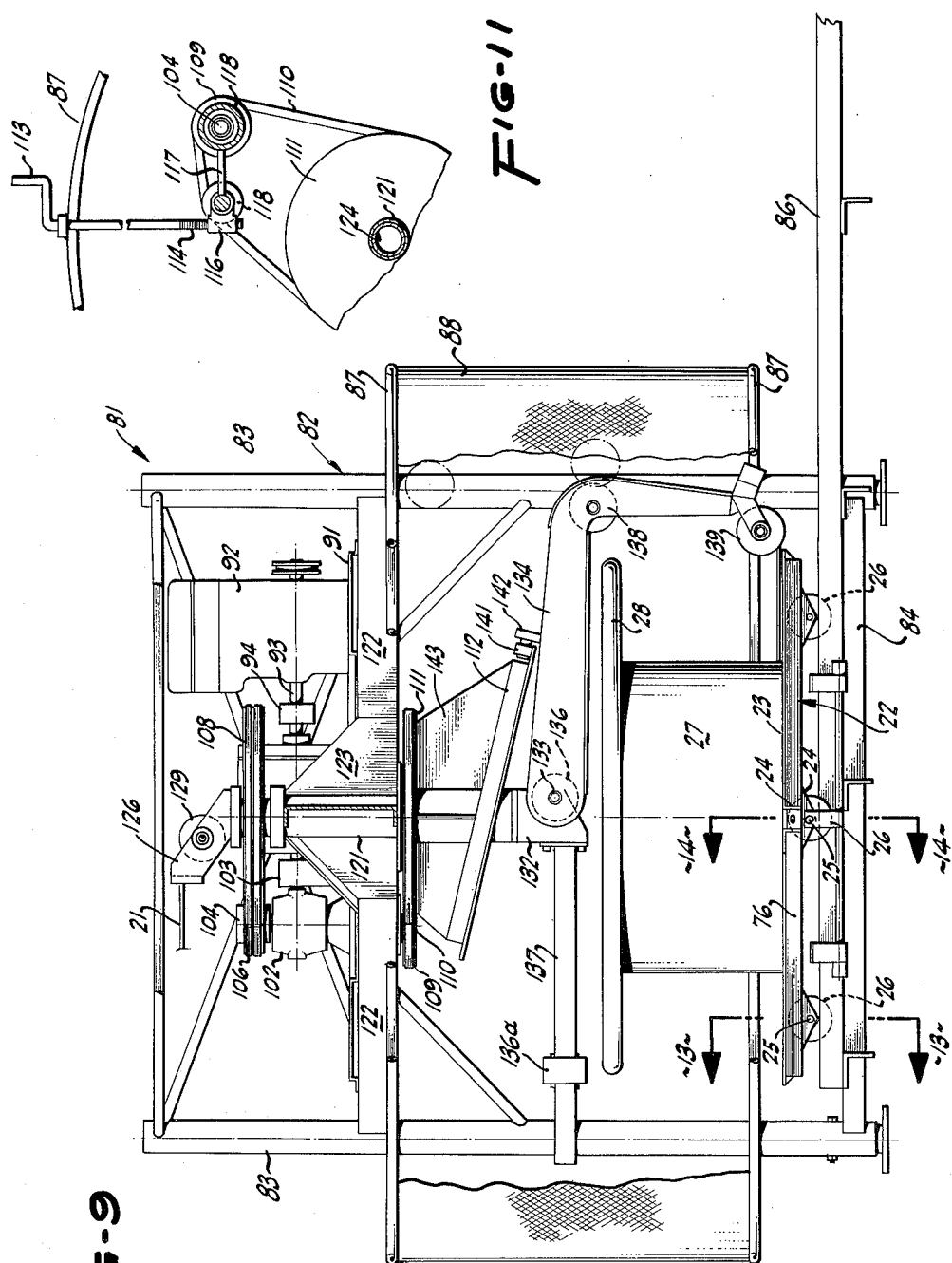
INVENTOR.
ROBERT W. GOODE
BY Julian Caplan
ATTORNEY

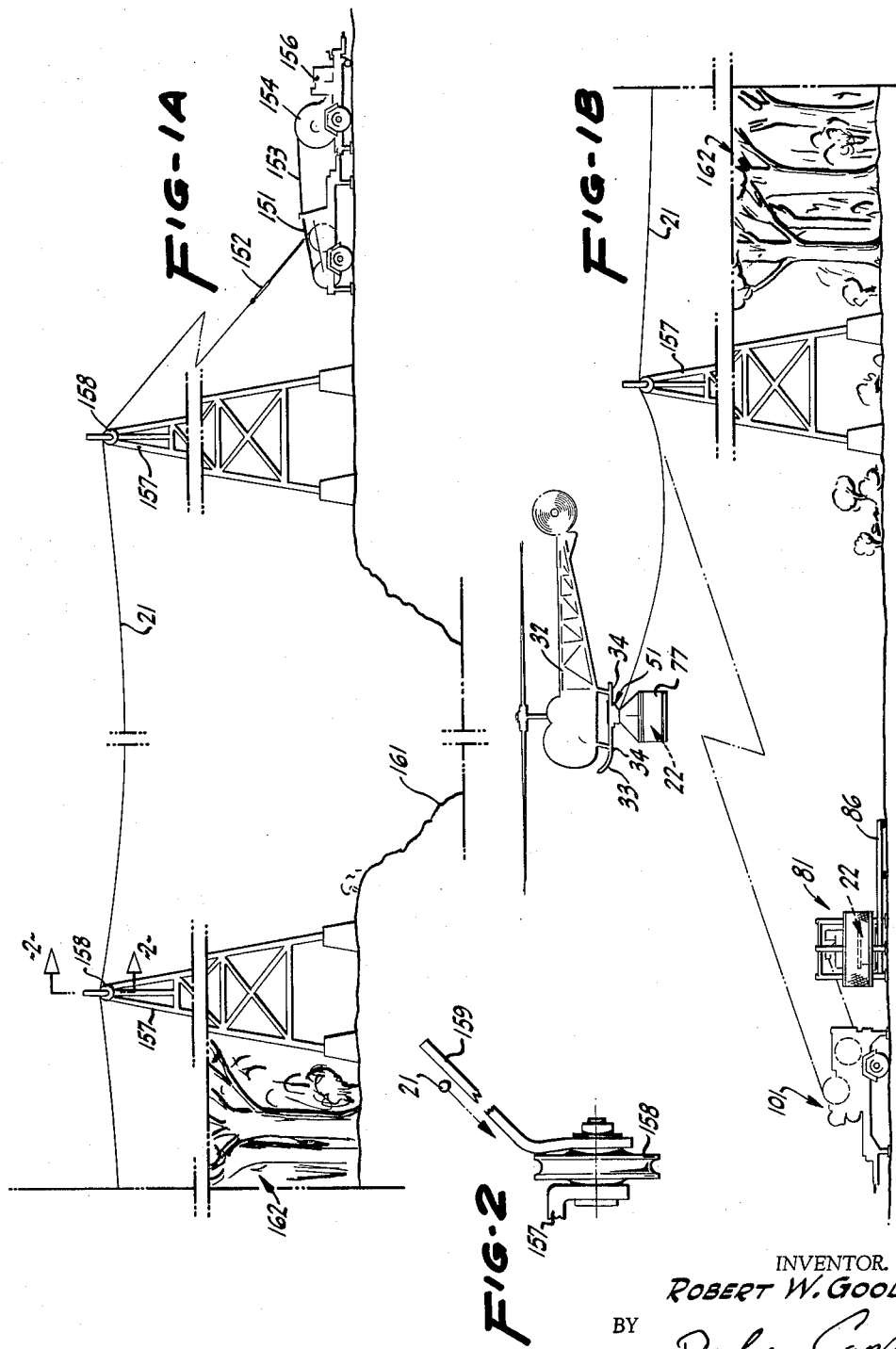

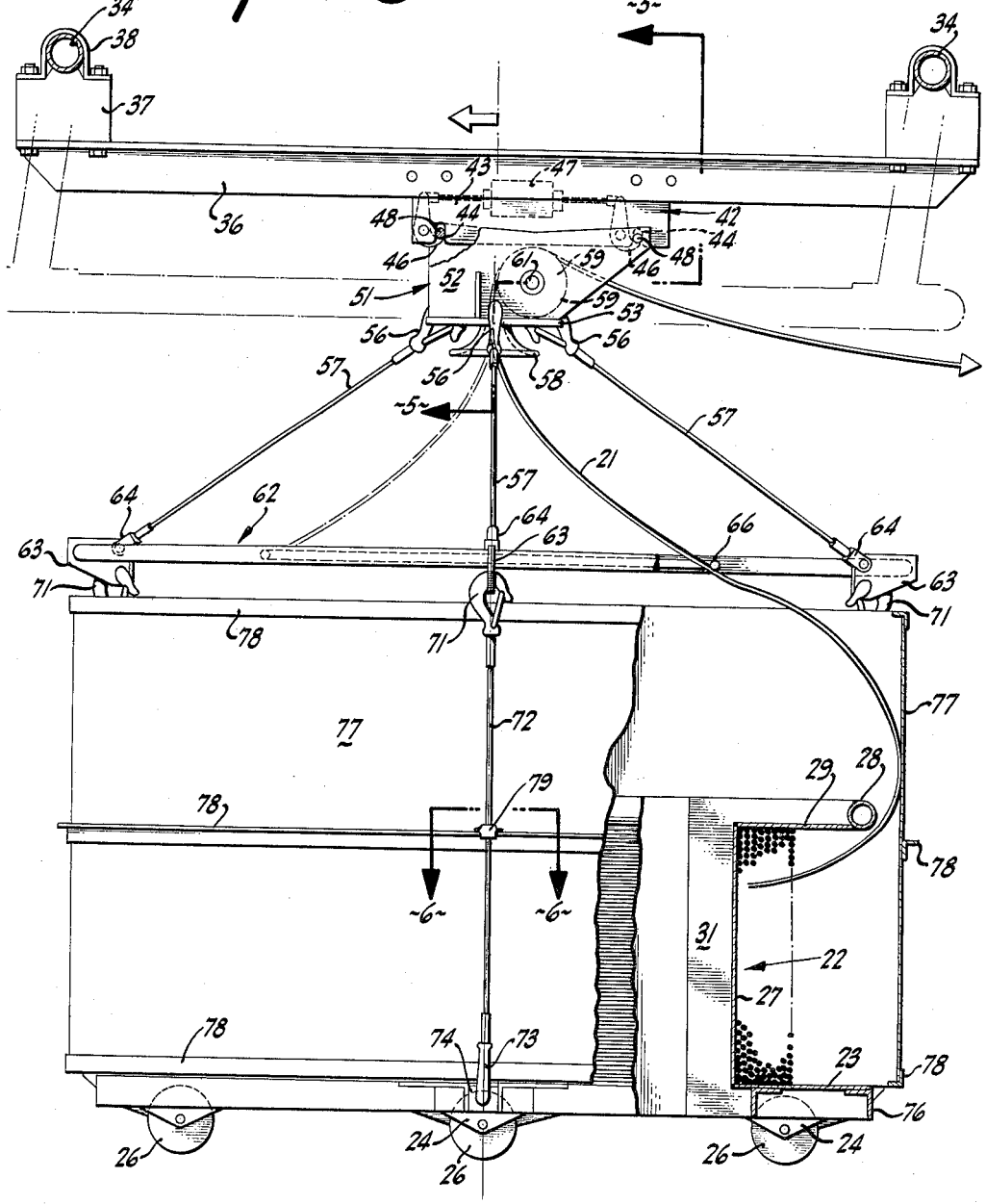

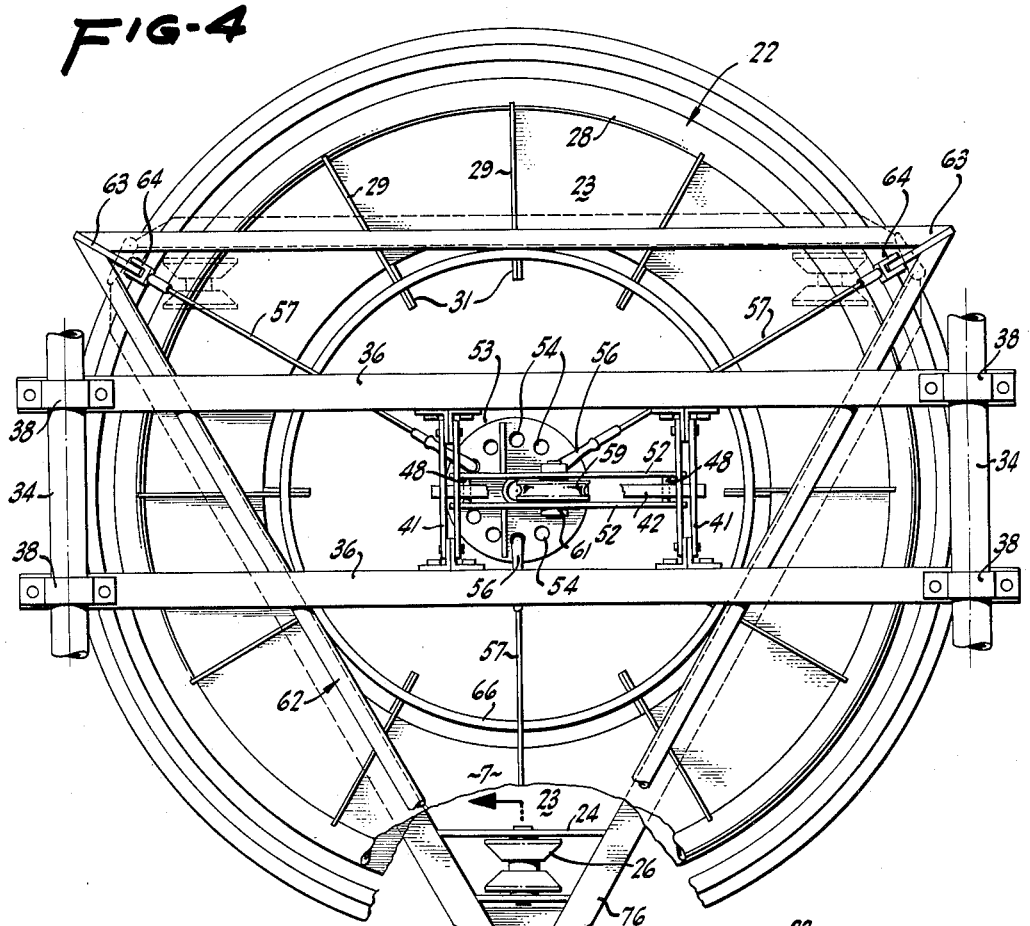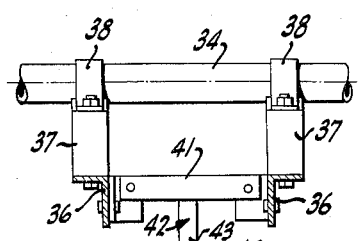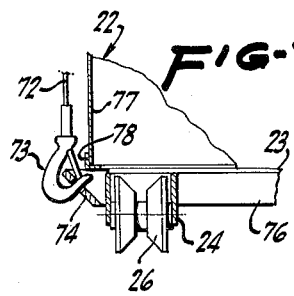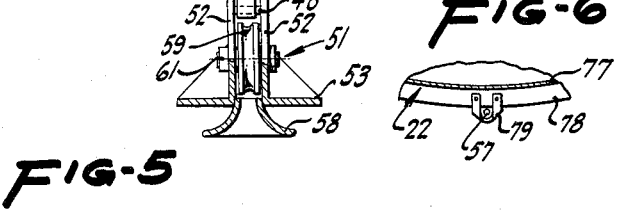

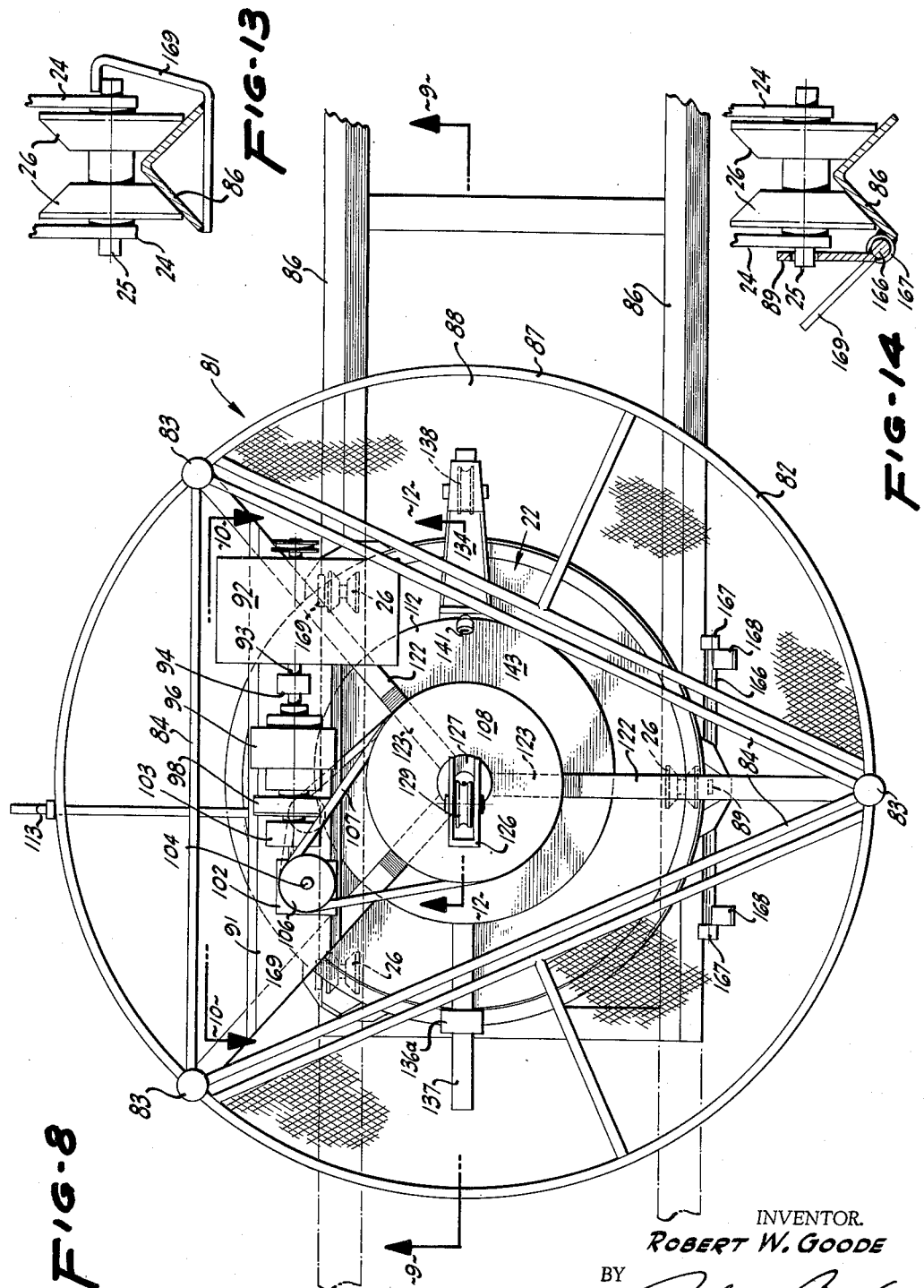

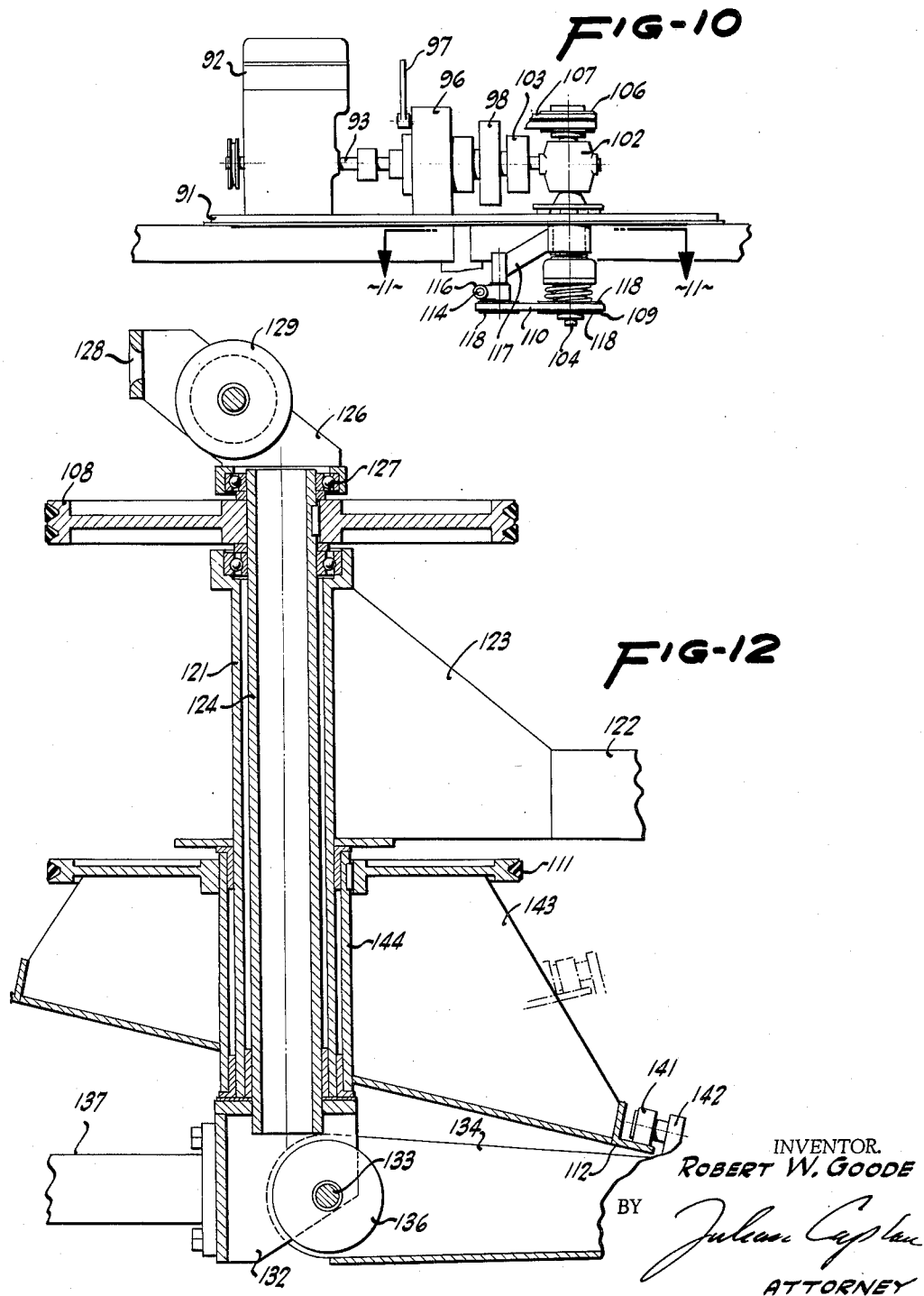

United States Patent Office 3,211,394
Patented Oct. 12, 1965

3,211,394
WINDING DEVICE FOR TWISTED CABLE
Robert W. Goode, Morgan Hill, Calif., assignor, by direct and mesne assignments of one-half to Gerald A. Petersen, Santa Clara, Calif., and one-half to Anita E. Petersen, Saratoga, Calif.
Filed Sept. 26, 1962, Ser. No. 226,414
5 Claims. (Cl. 242—82)

This invention relates to a new and improved method of stringing a conductor pulling cable by aircraft (preferably helicopter) and apparatus therefor.

At the present, electrical conductors are strung by using methods and apparatus which maintain the conductor in the air and under tension at all times thereby avoiding damage to the conductors. Ordinarily, a pulling line, such as a stranded cable of hemp, nylon, other synthetic material or steel is attached to the leading end of the conductor and is then run through stringing sheaves attached to the crossarms of the poles or towers. Any damage which may occur by reason of contact with the ground or obstructions is absorbed by the pulling cable. The function of the pulling line is to pull the conductor through the stringing sheaves. In the course of the operation, two pairs of bull wheels are used, one at each end of the line. The conductor is wound from its reel to the tensioner bull wheels which apply a braking force to the pulling of the conductor while the cable is rewound through puller bull wheels and then by means of a rewinder back onto a reel. The bull wheels on the puller are equipped with power for turning with a force greater than the braking action on the other end of the line, and if the equipment is properly operated the conductor never touches the ground at any time during the stringing operation and is maintained under a constant tension. The use of tension stringing avoids obstructions such as pre-existing power and telephone lines, roads, streets and railroad tracks which must be traversed by the line being strung.

A preliminary step in stringing of the conductor is the transportation of the pulling cable from a reel to the various poles or towers along the line. Heretofore, the common means of transporting the pulling cable tower to tower has been on the ground, as by means of a land motor vehicle. Various problems arise in connection with such ground transportation. In the first place, in many areas the terrain between towers or poles is relatively inaccessible. Thus, a deep canyon, rugged land surface, a heavy forest and buildings may make transportation of the pulling line from one point to another time-consuming, difficult or otherwise highly expensive. A second problem arises out of acquiring right-of-way and access roads along the ground for such transportation.

Accordingly, it has been proposed to transport the pulling cable from point-to-point by means of helicopter, or other aircraft, but such transportation prior to the present invention has been largely unsatisfactory.

Serious problems of inertia arise during transportation if the reel on which the pulling cable is wound is mounted on a spindle and caused to rotate to unwind the cable. It will be understood that helicoptors are inherently lightweight and highly maneuverable in that they change direction and speed rapidly and frequently. The inertia of a rotating reel which is of considerable weight, particularly when a long line is wound thereon, causes serious difficulty interfering with the maneuverability of the helicopter and endangering the machine and life of its pilot.

If the reel is mounted relative to the helicopter in a non-rotating manner, then as each turn of the line is stripped off the reel there must be a twisting of the line which twisting is absorbed by tightening or loosening the strands of the line. However, if the line after having been used to pull one conductor is rewound onto a reel by a conventional rewinder, wherein the reel is rotated to accomplish rewinding, and then reused, each time that the line is used the twisting of the strands is augmented. After only a few uses the line becomes snarled and must be discarded. Heretofore no effective means has been provided to untwist the line after each use, other than labor-consuming manual means. For example, to avoid the difficulties heretofore mentioned a line used for helicopter stringing of pulling lines has been hand-wound in a figure-eight loop in a box, the winding being labor consuming and also resulting in a bulky package of line which enhances transportation problems.

The present invention provides method and apparatus which eliminate the foregoing disadvantages of prior methods and apparatus for stringing pulling lines and makes possible the stringing of such lines by helicopter on a practical, labor-saving basis.

In the first place, the reel on which the line is wound is mounted relative to the helicopter in a non-rotating manner and hence removal of the line from the reel as the helicopter traverses the distance from pole-to-pole does not create inertia problems, since the only free weight at any given time is the length of line from one stringing sheave to the helicopter.

A second feature of the present invention is the provision of means for removal of the twist of the line as it is being rewound onto the reel and this permits the line to be used repeatedly since the initial twist of the strand is preserved and is not increased or decreased with repeated uses of the line.

Still another feature of the invention is the fact that the twist of the line may be removed in either direction in which the strands are laid relative to the direction of winding and the direction in which the line has been twisted by its immediately prior use can be accommodated by proper direction of turning of the rewinding machine, as hereinafter described in detail. As a subordinate feature of the rewinding mechanism, the reel winder may be so constructed as to wind the line level or, in other words, to move each turn of the line on the reel from one end to the other on the reel so that each layer is substantially flat.

A still further feature of the invention is the fact that the helicopter may deliver the line directly to sheaves mounted on the crossarms of the poles or towers rather than dropping the line on the ground at the base of the tower. This feature of the invention reduces the amount of labor required in hoisting the sheave or line from the ground to the crossarm.

Further, terrain and right-of-way problems are reduced in that the line need never come in contact with the ground and hence a cleared right-of-way from pole-to-pole or tower-to-tower is not necessary.

Another advantage of the invention is its greatly increased safety. The reel is suspended from the helicopter at a single point with a quick disconnect means for holding the reel suspended. Hence, in emergency the reel may be dropped almost instantaneously. Further, the possibility of the line snagging in the undercarriage of the helicopter is practically eliminated.

As a further feature of the mounting of the reel relative to the helicopter, swaying of the reel from side-to-side in its suspended position does not affect stability of flight of the helicopter, nor interfere with its maneuvering or mechanical operation.

Another advantage of the invention is the provision of means for rapidly picking up the reel from the ground either while the helicopter is on the ground or hovering above the ground and for delivering the empty reel to the rewinding station.

In addition, means is provided for rapid rewinding of the line onto the empty reel after it has been pulled by the tension puller.

Other advantages of the invention are the light weight of the reel, the carrier which mounts the reel on the helicopter and the rewinding mechanism, thereby reducing difficulties of transportation.

Another advantage of the invention is the fact that after the line has been delivered to the sheaves on the poles and towers, tension stringing equipment and methods as presently practiced may be used. In other words, after the line is once installed by helicopter a cable puller and a tensioner of a type presently well-known in the industry may be used to string the conductor under tension. However, in accordance with the invention a reel winder of special construction, hereinafter described in detail, which removes the twist from the line, is employed to rewind the line discharged from the tension puller onto the reel.

The present invention has particular application in installing pulling cables for stringing conductors. However, the invention has many other applications whenever repeated extension of a line between two relatively remote points is required. One example is replacing the use of guns which shoot lines to vessels in distress. When used in the claims, the terms "pulling cable," "stringing conductors" and the like will be understood to have a wider interpretation in view of the foregoing.

Other objects of the present invention will become apparent upon reading the following specification and referring to the accompanying drawings in which similar characters of reference represent corresponding parts in each of the several views.

In the drawings:

FIGS. 1A and 1B are composite schematic side elevational views illustrating schematically the method hereof.

FIG. 2 is an enlarged fragmentary view of a traveller sheave as viewed along the line 2—2 of FIG. 1A.

FIG. 3 is a side elevational view, partly broken away in section of a reel carrier and associated parts used in the invention.

FIG. 4 is a top plan of the structure of FIG. 3.

FIG. 5 is a fragmentary sectional view taken substantially along the line 5—5 of FIG. 3.

FIG. 6 is a fragmentary sectional view taken substantially along the line 6—6 of FIG. 3.

FIG. 7 is a fragmentary sectional view taken substantially along the line 7—7 of FIG. 4.

FIG. 8 is a top plan of a reel winder used in the invention, partly broken away in section.

FIG. 9 is a vertical sectional view taken substantially along the line 9—9 of FIG. 8.

FIG. 10 is a fragmentary elevational view as viewed along the line 10—10 of Fig. 8.

FIG. 11 is a fragmentary sectional view as viewed along the line 11—11 of FIG. 10.

FIG. 12 is an enlarged fragmentary sectional view as viewed along the line 12—12 of Fig. 8.

FIGS. 13 and 14 are fragmentary sectional views taken substantially on lines 13—13 and 14—14 of FIG. 9.

The reel

The pulling line or cable 21 used is preferably stranded material, such as hemp, nylon and other synthetic fibers, or metal such as steel. Such line may be twisted in either direction once or a few times without serious damage. Continued twisting in the same direction without removal of the twist eventually causes kinking and other serious damage which makes the line unusable for conductor stringing purposes. An important feature of the invention is elimination of continued twisting in the same direction.

The reel 22 on which the pulling line is wound for helicopter transportation is preferably of special light-weight construction. Thus, the base 23 of the reel is preferably an annular platform having on its bottom at least three roller-mounting brackets 24 on which are rotatively mounted rollers 26 used to slide the reel along a supporting surface or preferably on tracks used in conjunction with the reel winding mechanism hereinafter described.

A cylindrical core 27 extends up from base 24. The top of the reel has a tubular rim 28 of a diameter equal to the diameter of the space around which the stranded line wound on the reel passes as the line is stripped off of the reel. Rim 28 is supported by radial arms 29 and vertical ribs 31 interiorly of core 27 reinforce the same.

Reel Carrier

A preferred means for mounting reel 22 to a conventional helicopter is herein illustrated. In this mounting reel 22 is turned in horizontal position and does not rotate. The line 21 is stripped outward and upward around the outside of rim 28 as the helicopter 32 advances and hence there are no rotating or reciprocating parts carried by the helicopter which provide inertia problems. It will be understood, however, that the structure for mounting reel 22 as herein illustrated and hereinafter described is subject to considerable modification and that the reel can be carried in a vertical position and that other means for mounting the reel relative to helicopter 32 may be used. In this connection, it will be understood that the structure of helicopters varies with different models of manufacturers, and the preferred form of carrier is widely adaptable to various makes and models.

In the accompanying drawings there is shown schematically a helicopter 32 having an under-carriage with skids 33 on the bottom. Two transverse horizontal tubes 34 are furnished by the manufacturer and the carrier may be secured to such tubes 34. Accordingly, there are provided two horizontal longitudinally extending beams 36 (shown herein the form of angle bars) having at either end upstanding caps 37 provided with clamping straps 38 on the top. Straps 38 fit over tubes 34 of the helicopter under-carriage and secure the same to caps 37. Transverse horizontal hanger beams 41 extend between reel support beams 36 near the center and provide support for horizontally longitudinally extending emergency release mechanism 42. The structure of such release mechanism 42 is not herein illustrated nor described in detail, it being understood that it is a commercially available item of the type used to release bombs for military purposes. Essentially, there is provided a casing 43 formed with two slots 44 extending up from the bottom edge at either end, the lower end of each slot being obstructed by a retractible hook 46. The hooks are retracted by mechanical or electrical means 47 forming no part of the present invention and when so retracted pins 48 fitting horizontally through the slots 44 are released, permitting all of the structure supported by pins 48 to be dropped. This provides an emergency release under control of the pilot for the reel carrier structure in the event that, for any reason, it should be necessary to drop the same to prevent injury to the helicopter or its occupants.

Fitting below release mechanism 42 is a hanger assembly 51 consisting essentially of a pair of longitudinal vertical plates 52 carrying transverse pins 48 which fit into slots 44 in release mechanism 42. On the bottom of plates 52 is horizontal ring 53 formed with a plurality of apertures 54 to receive snap hooks 56 on the upper ends of upper slings 57. Facing downwardly below ring 53 is the mouth of funnel shaped guide 58 which receives line 21. Sheave 59 is mounted on transverse horizontal pin 61 between the plates 52 and also guides the pay-out of line 21.

Below hanger 51 is a triangular mounting frame 62 having eye pads 63 at each corner to which are attached by means of shackles 64 the lower ends of slings 57. It will be understood that a three-point triangular suspension, as herein illustrated and above desscribed, is desirable, but the number of points of suspension is subject to variation. Mounted centrally of triangular frame 62 is a ring 66 having smooth surface which provides another of the guide elements for the path of the line 21 from reel 22 through sheave 59. The three eye pads 63, in addition to providing anchorage for the lower ends of upper slings 57, also provide attachment for snap hooks 71 on the upper ends of three lower slings 72. Snap hooks 73 on the down ends of slings 72 are attached to offsets 74 on reinforcing rim 76 below base 23 of reel 22.

To prevent line escaping from a confined path from reel 22 to the inside of ring 66, a cylindrical shroud 77 of sheet-metal rests on offsets 74 of base 23 to a height slightly below triangular frame 62. Reinforcing rings 78 at top, bottom and center of shroud are provided. Retainers 79 on center ring 78 provide guides for slings 72.

The line 21 wound on reel 22 runs from the space between base 23 and arms 29 around the side of the top rim 28, thence inside shroud 77, inside ring 66, through funnel guide 58 and over sheave 59 and outwardly. Centrifugal force causes line 21 to contact shroud 77 in a wide loop, the shroud preventing the line from looping farther outward and creating possible danger of snagging. It will be noted that as the line is stripped from reel 22 it is twisted as it is displaced from its helical position to a straight line. Ordinarily, construction of line 21 is such that such twisting is absorbed easily so long as the twisting is not repeated. It is necessary, however, to insure that the twist is removed from the line when it is rewound on the reel to prevent the accumulation of separate twists from ruining the line.

Reel winder

It is desirable that line 21 be rewound onto reel 22 after it has been used and it is further desirable that twist in the line be removed and that the line be wound level. In a preferred practice of this invention, line 21 is pulled in by a tensioner puller 101 and as discharged therefrom is received by rewinder 81.

The reel winder 81 comprises a frame 82 consisting of three stanchions 83 mounted on the ground interconnected by triangular horizontal frame members 84 near the bottom. Tracks 86 consisting of inverted angle bar along which the empty and full reel 22 may be rolled along wheels 26 extend through the gap between stanchions 83. Guard rails 87 and guard cage 88 supported by stanchions 83 surround the machine to prevent rotating parts from injuring personnel. The reel 22 after it has been installed in place is stationary relative to the winder and for such purpose apertured latches 89 are mounted on rod 166 which turns in brackets 167 on one of tracks 86 under control of foot pedals 168. The holes in latches 89 fit over the outward protruding stub shafts 25 of wheels 26. Thus latches 89 secure reel 22 in place both longitudinally of tracks 86 and also against lifting from the tracks. Hooks 169 on the other track 86 assist in preventing lifting of the reel.

Engine mounting plate 91 stands horizontally adjacent the top of the winder within the confines of stanchions 83. A preferred form of winder power mechanism mounted on plate 91, as herein illustrated, consists of gasoline or electrically driven engine 92, the drive shaft 93 of which is connected to a coupling 94 and thence to a transmission 96 having a reverse gear mechanism controlled by hand lever 97. The transmission 96 is used primarily to reverse the direction of winding of the reel, depending upon the twist which has previously been imparted to line 21 being wound thereon but by shifting gears also may be used to control the speed of winding. A magnetic slip coupling 98 is connected to transmission 96. It will be understood that reel winder 81 is not used to pull the line under tension, but merely receives the line from a tension puller 101. Hence, the feed of line into winder 81 is intermittent and the magnetic slip coupling 98 permits the driving engine 92 to turn at substantially constant speed despite the intermittent operation of winder 81. A right-angle drive mechanism 102 is connected to magnetic coupling 98 by means of coupling 103, so that the shaft 104 thereof is in a vertical direction as distinguished from the horizontal direction of the shafts of the mechanisms heretofore mentioned. On the upper end of the shaft 104 is sheave 106 connected by belt 107 to sheave 108. Shaft 104 of the right-angle drive 102 also extends downward and carries a second sheave 109 which is of variable pitch and connected by belt 110 to sheave 111 on cam 112.

The effective diameter of variable pitch sheave 109 is controlled by means of a hand lever 113 projecting outwardly of the winder assembly. Turning of handle 113 and threaded inner end 114 thereof causes movement of nut 116 on arm 117 pivotally mounted on sheave 109. This movement affects the outward displacement of idler pulley 118 on arm 117 which rides on belt 110. The characteristic of variable pitch sheave 109 is that the greater the tension on belt 110 the wider apart the bevelled flange members 118 of sheave 109 spread and this reduces the effective diameter when used with a V-belt. Change in the effective diameter of sheave 109 affects the speed ratio between sheave 109 and sheave 111 and hence the relative rotation of sheaves 108 and 111.

A central tubular guide 121 is mounted relative to stanchions 83 by horizontal members 122 and braces 123. Within guide 121 is rotatably mounted tubular shaft 124 which carries sheave 108 adjacent its upper end. A fairlead 126 is mounted by means of bearing 127 on the upper end of shaft 124 having a horizontal opening 128 and carrying a guide pulley 129 disposed upon a horizontal axis. Hence, line received from the tension puller 101 enters the reel winder through fairlead 126, over pulley 129 and thence down the center of shaft 124. The direction toward which fairlead 126 may be pointed is variable depending on the location of puller 101 relative to winder 81.

On the lower end of shaft 124 is a fitting 132 to which is pivoted by pin 133 a level wind bail 134. A pulley 136 on pin 133 is installed interiorally of hollow bail 134 as a line guide. A counterweight 136a adjustable on outwardly projecting arm 137 is fixed to fitting 132 to maintain dynamic balance. Bail 134 is angular in shape and at the corner of the bail is another guide pulley 138 and at the lower end is a third pulley 139. Thus, bail pivots around pin 133 and pulley 139 from which line 21 is discharged is raised and lowered from side-to-side of reel 22 to maintain the line wound thereon level.

The movement of bail 134 is controlled by means of cam follower 141 mounted thereon by bracket 142 which engages diagonally mounted annular disc cam 112. Cam 112 has a conical exterior 143 around a central sleeve 144 mounted outside guide 121 and carries sheave 111 on its upper end. Cam 112 does not rotate in synchronism with shaft 124 because of the difference in the effective diameters of the drive pulleys 106 and 109.

The operation of the reel winder 81 is as follows: Line 21 is brought in from the tension puller 101 through fairlead 126 over sheave 129 and down hollow shaft 124. At the lower end of the shaft 124 it is brought under pulley 136 and over pulley 138 and thence around pulley 139. As line 21 is drawn in, shaft 124 and bail 134 revolve and revolve at a different speed with respect to cam 112. The revolution of bail 134 relative to stationary reel 22 on which the line is being wound causes the line to be twisted. The direction of rotation of shaft 124 is controlled by lever 97 opposite to the twist imparted therein by having been previously stripped off reel 22 as the line was strung in previous usage. Removal of the twist prevents the line from being ruined by repeated use. By reason of the difference in speed of revolution of cam 112 relative to shaft 124 the bail 134 moves upward and downward pivoting around pivot 133 causing the pulley 139 to move across the width of the reel 22 and winding the line level. The ratio of the relative movements of the two sheaves 108 and 111 controlling respective rotation of the shaft 124 and cam 112 can be adjusted by hand lever 113.

*Method*

In use, a stranded line 21 is preferably used made of hemp, nylon, steel, or the like. Such line is wound on a reel 22 of the type hereinbefore described. The outer end of the line 21 is brought around the bull wheel tensioner mechanism 151, such as that shown in Peterson Patent No. 2,959,253, and thence is is connected by a pulling sleeve 152 of a type well understood in the industry to one end of a conductor 153 which is unwound from its reel 154 on carrier 156 and fed into tensioner 151. It will be understood that where conductor 153 is exceptionally heavy it may be desirable to connect the line to an intermediate line of greater strength, as is also well understood in the industry. In any event, the line 21 is connected directly or through an intermediate size of line to the conductor. Reel 22 is mounted inside shroud 77 and is attached by shrouds 72 to member 62 which is attached to helicopter 32 by shrouds 57. The order of attachment to the helicopter is subject to variation. Where the circumstances are such that the helicopter alights, reel 22 is loaded into shroud 77 and is connected by snap hooks 56 to the support structure 56 on the underside of the helicopter. It will further be understood that this operation may be performed while the helicopter hovers. The helicopter moves away from the tensioner 151 preferably flying at the height of the crossarms of the poles or towers 157 to which the line is to be strung. A preferred method of handling the line at the pole 157 is to provide a traveler sheave 158 on each crossarm, preferably having a diagonally outwardly and upwardly slanted guide rod or "whisker" 159 connected stationarily to the axis of the traveler sheave 158. The line 21 is so directed that it drops onto the top of guide 159 and then slides downwardly into the groove of the sheave 158 and rests thereon. The helicopter 32 is flown from pole-to-pole 157, and as it flies, by reason of the fact that the outer end of line 21 is fixed to tensioner 151 or to a stationary point near the tensioner, the line is pulled off the reel 22 passing out through the sheave 59, as has heretofore been explained.

It will be understood that alternatively the line 21 may be deposited at the base 157 of the tower and thence \connected to the traveler sheave 158 which is then hoisted to the crossarm, but where conditions make it possible to do so it is desirable to lay the line directly into the sheave 158 already mounted on the crossarms.

This method of stringing the line through the sheaves permits the helicopter 32 to fly over very rough terrain, traversing canyons 161, forests 162 and buildings, which would otherwise create right-of-way problems and installation problems. The inner end of line 21 is finally dropped to a tensioner puller 101 of the type shown in Petersen Patent No. 2,991,977.

The tensioner puller 101 pulls the line 21 through the sheaves 158 and the conductor 153 follows through the sheaves. As the line leaves the tension puller 101 it is received by the reel winder 81 which winds the line onto a reel 22 for reuse.

As has heretofore been explained, when the line 21 is stripped off the stationary reel 22 during the flight of the helicopter 32 a twist is imparted thereto as it changes from helical to straight line conformation. The reel winder 81 removes the twist as it winds the line onto reel 22, thereby permitting the repeated reusage of the line. When the reel is wound it is slid to one side on tracks 86 and is then used to reload the helicopter.

Although the foregoing invention has been described in some detail, by way of illustration and example for purposes of clarity of understanding, it is understood that certain changes and modifications may be practiced within the spirit of the invention and scope of the appended claims.

What is claimed is:

1. A rewinding machine for twisted cable comprising a frame for supporting a reel, a hollow shaft, means rotatively mounting said shaft on said frame, guide means for guiding cable from an external source into a first end of said shaft, an arm mounted for rotation about said reel, second guide means on said arm for cable from a second end opposite said first end of said shaft, a prime mover, transmission means actuated by said prime mover for revolving said arm around the axis of said shaft to wind cable around said reel, said shaft terminating spaced above the bottom of said frame, guideways at the bottom of said frame, extending laterally of said frame to guide installation and removal of a reel from a position remote from said machine to a position aligned below said shaft and at the level of said arm, and levelwind means actuated by said transmission means and connected to said arm to guide cable in level layers as it is wound on said reel.

2. A machine according to claim 1, which further comprises a reverse gear in said transmission means for reversing the direction of rotation of said arm, said reverse gear operable to turn said arm in either direction of rotation to untwist twisted cable as said cable is wound on said reel.

3. A rewinding machine for twisted cable comprising a frame for supporting a reel, a hollow shaft, means rotatively mounting said shaft on said frame, guide means for guiding cable from an external source into a first end of said shaft, an arm mounted for rotation about said reel, second guide means on said arm for cable from a second end opposite said first end of said shaft, a prime mover, transmission means actuated by said prime mover for revolving said arm around the axis of said shaft to wind cable around said reel, means pivotally mounting said arm about an axis transverse to the axis of said shaft and means for swinging said arm about its pivot axis to level wind cable on said reel.

4. A rewinding machine for twisted cable comprising a frame for supporting a reel, a hollow shaft, means rotatively mounting said shaft on said frame, guide means for guiding cable from an external source into a first end of said shaft, an arm mounted for rotation about said reel, second guide means on said arm for cable from a second end opposite said first end of said shaft, a prime mover, transmission means actuated by said prime mover for revolving said arm around the axis of said shaft to wind cable around said reel, pivotal mounting means for mounting said arm for pivotal movement transverse to the axis of said shaft, a cam follower on said arm, a cam on said frame driven by said prime mover at a speed of rotation different from the speed of rotation of said arm, said cam follower engaging said cam, said cam shaped to pivot said arm to level wind said cable on said reel.

5. A machine according to claim 4, which further comprises manually adjustable means to vary the speed of said cam relative to said arm.

References Cited by the Examiner

UNITED STATES PATENTS

| | | | |
|---|---|---|---|
| 2,216,225 | 10/40 | Bruestle | 242—82 |
| 2,436,402 | 2/48 | Potter | 254—134.3 |
| 2,490,032 | 12/49 | Cunningham | 254—134.3 |
| 2,849,194 | 8/58 | Henning | 242—82 |
| 2,911,166 | 11/59 | Hauguitz | 242—128 |
| 2,930,541 | 3/60 | Crum | 242—128 |
| 2,991,956 | 7/61 | Bruestle | 242—82 |

WILLIAM FELDMAN, *Primary Examiner.*